(12) United States Patent
Arthur et al.

(10) Patent No.: US 10,307,886 B2
(45) Date of Patent: *Jun. 4, 2019

(54) GUARD AND CONTROL APPARATUS FOR SAFE OPERATION OF A ROTARY CUTTER

(71) Applicants: Robert Arthur, Trenton, MI (US);
Nicholas J. Russell, Kirtland, OH (US)

(72) Inventors: Robert Arthur, Trenton, MI (US);
Nicholas J. Russell, Kirtland, OH (US)

(73) Assignee: G.A.W. Inc., Romulus, MI (US)

( * ) Notice: Subject to any disclaimer, the term of this patent is extended or adjusted under 35 U.S.C. 154(b) by 10 days.

This patent is subject to a terminal disclaimer.

(21) Appl. No.: 15/648,562

(22) Filed: Jul. 13, 2017

(65) Prior Publication Data

US 2018/0264622 A1 Sep. 20, 2018

Related U.S. Application Data

(60) Provisional application No. 62/472,843, filed on Mar. 17, 2017.

(51) Int. Cl.
| | |
|---|---|
| *B23D 45/16* | (2006.01) |
| *B24B 23/02* | (2006.01) |
| *B24B 55/05* | (2006.01) |
| *B27G 19/04* | (2006.01) |

(52) U.S. Cl.
CPC ............ *B24B 55/052* (2013.01); *B23D 45/16* (2013.01); *B27G 19/04* (2013.01); *B24B 23/028* (2013.01)

(58) Field of Classification Search
CPC ..... B27G 19/04; B27G 19/02; Y10T 16/4713; B25F 5/02; B25F 5/026; B24B 55/052; B24B 55/04; B24B 23/005; B24B 23/02; B24B 23/028

USPC ......... 16/426, 430; 30/296.1, 298, 276, 391; 173/170; 83/478, 860, 397; 451/451, 451/452, 344, 359

See application file for complete search history.

(56) References Cited

U.S. PATENT DOCUMENTS

| | | | | |
|---|---|---|---|---|
| 1,270,430 A | * | 6/1918 | Martin | ...................... B27B 9/00 30/371 |
| 1,740,074 A | * | 12/1929 | Crowe | ...................... B27B 9/00 30/377 |

(Continued)

FOREIGN PATENT DOCUMENTS

GB 2346580 A * 8/2000 ........... B24B 55/052

*Primary Examiner* — Laura M Lee
(74) *Attorney, Agent, or Firm* — Mark A. Navarre

(57) ABSTRACT

A power tool that drives rotary cutting element has a retractable guard for the cutting element, and a guard control apparatus allows a user to maintain the guard in a retracted position during operation of the power tool. The guard control apparatus includes an auxiliary handle fastened to the housing of the power tool, and latching elements linked to a spring-biased lever mounted in the auxiliary handle for selectively and temporarily retaining the retractable portion of the guard in a retracted position to enable plunge and other complex cutting operations. Maintaining the retractable portion of the guard in the retracted position during operation of the power tool thereby occupies both hands of the user. This not only helps the user stabilize and accurately control the power tool, but also keeps both of the user's hands safely away from the exposed cutting element in the event of a sudden kickback.

12 Claims, 4 Drawing Sheets

(56) References Cited

U.S. PATENT DOCUMENTS

| Patent/Publication No. | Date | Inventor | Classification |
|---|---|---|---|
| 1,811,577 A * | 6/1931 | Crowe | B27G 19/04 30/377 |
| 1,813,231 A * | 7/1931 | Crowe | B27G 19/04 30/377 |
| 1,900,553 A * | 3/1933 | Hampton | B23D 47/126 30/391 |
| 2,342,052 A * | 2/1944 | Jimerson | B27B 9/00 30/263 |
| 2,737,985 A * | 3/1956 | Utz | B27G 19/04 30/373 |
| 2,741,282 A * | 4/1956 | Wieting | B27B 5/08 144/136.1 |
| 2,801,654 A * | 8/1957 | Utz | B27G 19/04 144/251.1 |
| 2,963,056 A * | 12/1960 | Rickford | B27G 19/04 30/391 |
| 2,993,518 A * | 7/1961 | Bork | B27B 5/38 188/60 |
| 3,063,481 A * | 11/1962 | Sutherland | B27G 19/04 30/391 |
| 3,177,909 A * | 4/1965 | Laube | B27G 19/04 30/391 |
| 3,221,783 A * | 12/1965 | Kaltenmark | B27B 5/14 30/376 |
| 3,613,748 A * | 10/1971 | De Pue | B27G 19/04 30/373 |
| 3,805,639 A * | 4/1974 | Peter | B23Q 11/06 30/391 |
| 3,969,856 A * | 7/1976 | Zerrer | B24B 55/04 144/251.1 |
| 4,685,214 A * | 8/1987 | Shearon | B27G 19/04 125/13.01 |
| 4,693,008 A * | 9/1987 | Velie | B27G 19/04 30/388 |
| 4,924,635 A * | 5/1990 | Rudolf | B24B 55/052 451/344 |
| 5,075,976 A | 12/1991 | Young | |
| 5,129,300 A * | 7/1992 | Kawakami | B27G 19/02 30/391 |
| 5,766,062 A * | 6/1998 | Edling | B23Q 11/0092 451/359 |
| 5,974,674 A * | 11/1999 | Kelly | B27B 5/08 144/136.95 |
| 6,415,699 B1 * | 7/2002 | Bettacchini | B27G 19/02 83/397 |
| 6,588,111 B2 * | 7/2003 | Williams | B27B 5/08 30/276 |
| 6,893,334 B1 * | 5/2005 | Stivers | B24B 23/028 451/354 |
| 6,949,017 B2 * | 9/2005 | Koschel | B24B 23/02 451/358 |
| 6,962,523 B2 * | 11/2005 | Fraser | B23Q 11/005 451/259 |
| 7,020,970 B1 * | 4/2006 | Welch | B27G 19/04 30/391 |
| 7,426,787 B2 * | 9/2008 | Tracy | B27G 19/04 30/373 |
| 8,413,340 B2 | 4/2013 | Orlowski | |
| 8,454,412 B2 * | 6/2013 | Esenwein | B24B 55/052 451/344 |
| 8,784,164 B2 * | 7/2014 | Dai | B24B 55/05 451/359 |
| 9,550,274 B2 * | 1/2017 | Tagscherer | B24B 23/028 |
| 2002/0166244 A1 * | 11/2002 | Williams | B27B 5/08 30/388 |
| 2003/0041717 A1 * | 3/2003 | Evenson | B23D 45/16 83/663 |
| 2003/0075028 A1 * | 4/2003 | Hofmann | B24B 23/02 81/466 |
| 2004/0224621 A1 * | 11/2004 | Fraser | B23Q 11/005 451/359 |
| 2005/0252012 A1 | 11/2005 | Johnson, III | |
| 2008/0168667 A1 * | 7/2008 | Spinato | B23D 45/003 30/391 |
| 2009/0209184 A1 * | 8/2009 | Esenwein | B24B 23/028 451/451 |
| 2010/0178857 A1 * | 7/2010 | Esenwein | B24B 23/028 451/359 |
| 2010/0323595 A1 * | 12/2010 | Nagy | B24B 23/02 451/452 |
| 2014/0004778 A1 * | 1/2014 | Chen | B24B 23/028 451/359 |
| 2016/0039068 A1 * | 2/2016 | Morris | B24B 55/052 451/455 |

* cited by examiner

GUARD AND CONTROL APPARATUS FOR SAFE OPERATION OF A ROTARY CUTTER

RELATED APPLICATIONS

This application claims priority based on the Provisional Patent Application No. 62/472,843, filed Mar. 17, 2017.

TECHNICAL FIELD

This invention relates to pneumatic or electric rotary cutter power tools, and more particularly to a guard and guard control apparatus for improving the safety of workers using such power tools.

BACKGROUND OF THE INVENTION

Rotary cutter power tools of the pneumatic or electric variety are used in many industrial applications that require a worker to manually cut heavy material such as plate steel or aluminum. The cutting element can be an abrasive disk or a toothed wheel, depending on the application. Even when used by skilled operators, such cutting tools can be hazardous due to flying debris and a phenomenon known as kick-back, where the business end of the power tool suddenly jumps away from the workpiece. Safety guards that partially enclose the cutting element can reduce the risk of user injury to a great degree, but can also interfere with the desired use of the tool. For example, when the worker needs to make a plunge cut (that is, where the cutting element is brought into contact with a non-marginal portion of the workpiece) or other complex cut, the guard must first be retracted to expose the leading portion of the cutting element.

One way of addressing the above-described problem is disclosed in the U.S. Pat. No. 5,075,976 to Young, issued on Dec. 31, 1991. As shown by Young, a guard retainer releasably holds a movable portion of a saw guard in a retracted position exposing a portion of the saw blade during operation of the saw. A lever located adjacent the tool handle is depressed by the user to hold the guard retainer in a latching position against an opposing bias force so that when the user releases the lever, the movable portion of the guard returns to its un-retracted position covering the saw blade. Locating the lever adjacent the handle is said to be advantageous in that it allows single-handed operation of the tool, but single-handed use of many power cutting tools can in practice expose the user's free hand to unnecessary risk, particularly in the event of a sudden kick-back. Accordingly, what is needed is a guard positioning mechanism that allows the user to safely operate the power tool, and in particular, to avoid injury in the event of a sudden kickback.

SUMMARY OF THE INVENTION

The present invention is directed to an improved guard and guard control apparatus for a rotary cutting power tool that gives the user greater control over the power tool, while keeping both hands of the user away from the cutting element in the event of a sudden kickback. The guard includes a retractable portion, and the guard control apparatus includes an auxiliary handle (that is, a secondary handle used to stabilize and help support the tool driver) fastened to the housing of the power tool, a spring-biased lever, and latching elements mounted in the auxiliary handle for selectively and temporarily latching the retractable portion of the guard in a retracted position to enable plunge and other complex cutting operations. When the user releases the spring-biased lever on the auxiliary handle, the retractable portion of the guard is released and returns to its default or un-retracted position.

Maintaining the retractable portion of the guard in the retracted position during operation of the power tool in this manner occupies both hands of the user. This not only helps the user stabilize and accurately control the power tool, but also keeps both of the user's hands safely away from the exposed cutting element in the event of a sudden kickback.

In a preferred embodiment of the present invention, the guard control apparatus is configured to allow the user to select one of several possible retracted positions of the retractable portion of the guard, and the entire guard assembly can be rotated to accommodate any desired cutting operation without affecting the guard latching operation of the spring-biased lever.

DESCRIPTION OF THE PREFERRED EMBODIMENT

Figure 1A:
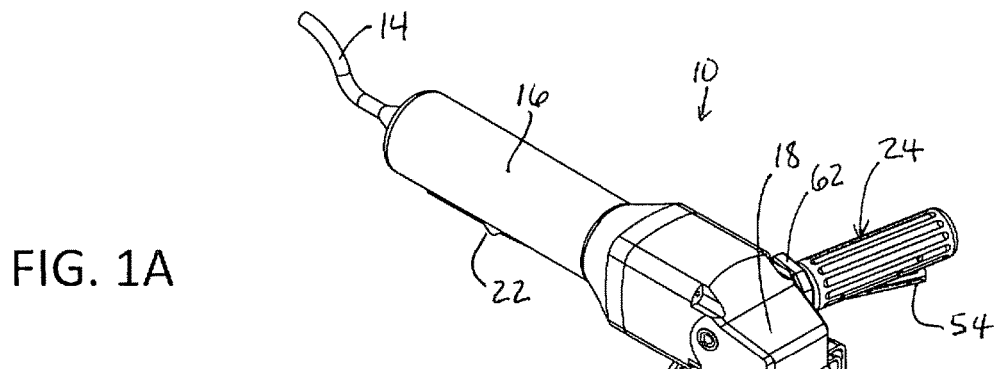
FIG. 1A is an isometric view of rotary cutting power tool equipped with the guard and guard control apparatus of the present invention, with the retractable portion of the guard mechanism in a fully retracted position.

In general, the improved guard and guard control apparatus of this invention is applicable to any electric or air powered rotary cutting power tool. For purposes of illustration, and referring for example to FIGS. 1A-1C, the apparatus of this invention is utilized in connection with an electric angle grinder power tool 10 equipped with a cutting element 12 such as a toothed wheel. The illustrated power tool 10 has a power cord 14, a tubular rear housing 16 that is grasped with the user's left hand, a front housing 18 that is fastened to the rear housing 16, and a spindle housing 19 and output shaft 20 oriented perpendicular to the rear and front housings 16 and 18, the cutting element 12 being mounted on the output shaft 20. In general, the rear housing 16 encloses an electric motor and control circuitry, whereas the front housing 18 encloses a gearing mechanism that couples the rotor of the electric motor to the output shaft 20. A lever-style on/off switch 22 is mounted on the underside of the front housing 16, and can be actuated by the fingers of the user's hand to turn the power tool 10 on and off. An auxiliary handle 24 is fastened to the left side of the front housing 18 so as to be grasped by the user's left hand during operation of the power tool 10, leaving the user's right hand free to grasp the rear housing (and switch 22). Optionally, the auxiliary handle 24 can be fastened to the right side of the front housing 18, in which case, the user's left hand grasps the rear housing 16 (and switch 22), and the user's right hand grasps the auxiliary handle 24.

Figure 1B:
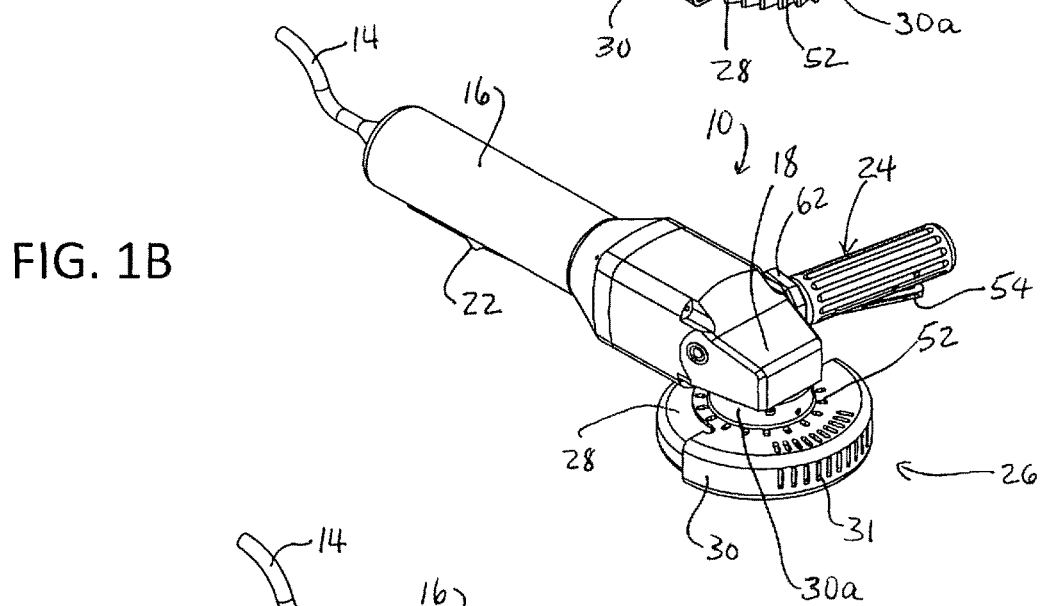
FIG. 1B is an isometric view of rotary cutting power tool and guard mechanism of FIG. 1A, but with the retractable portion of the guard mechanism in its default or un-retracted position.

A guard mechanism, generally designated by the reference numeral 26, is fastened to the spindle housing 19 for at least partially enclosing the cutting element 12. The guard mechanism 26 includes a first (inner) portion 28 that encloses one half of the cutting element 12, and a second (outer) portion 30 that selectively encloses the other half of the cutting element 12. The first guard portion 28 is fixed with respect to the spindle housing 19, and is also referred to herein as the fixed guard portion. The second guard portion 30, on the other hand, is rotatably mounted on the first guard portion 28, and is also referred to herein as the movable or retractable guard portion. An internal spring extension 32 coupling the guard portions 28 and 30 biases the retractable guard portion 30 to a default position enclosing its half of the cutting element 12, as depicted in FIG. 1B. But the second guard portion 30 may be retracted against the bias force of extension spring 32 to partially or fully expose the its half of the cutting element 12, as depicted FIGS. 1A and 1C. Retraction of the guard portion 30 can occur automatically during operation of the power tool when the leading edge of the guard portion 30 contacts a workpiece, or manually when the power tool 10 is off.

Figure 1C:
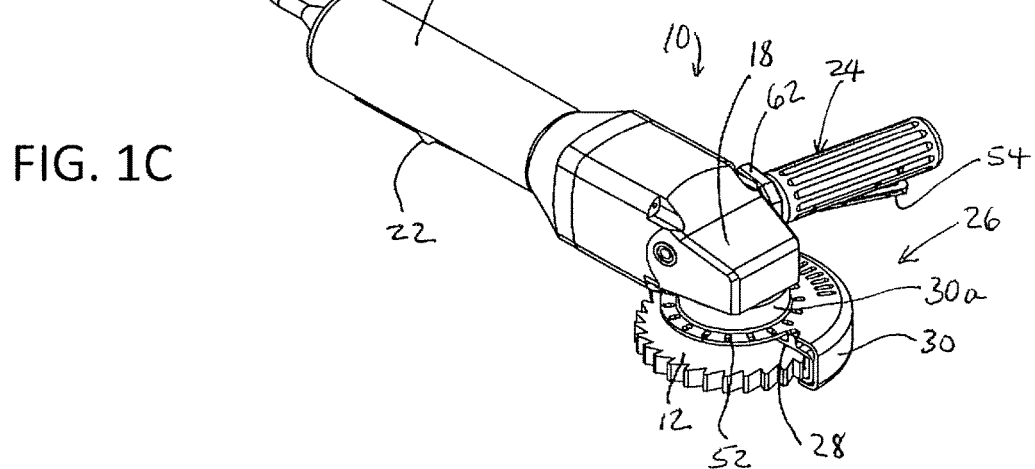
FIG. 1C is an isometric view of rotary cutting power tool of FIG. 1A, but with the guard mechanism rotated clockwise by ninety degrees.

An advantageous feature of the guard mechanism 26 is that it can be rotated in its entirety to any desired orientation without losing its functionality. FIGS. 1A-1B depict a typical orientation of the guard mechanism 26 in which the fixed guard portion 28 encloses the rear half of the cutting element 12, and the retractable guard portion 30 selectively exposes up to the entire front half of the cutting element 12 (as shown in FIG. 1A). However, if a user desires to cut in a direction other than forward of the power tool 10, the guard mechanism fasteners (described below) can be loosened to permit rotation of the guard mechanism 26 to a desired orientation, and then re-tightened. For example, if the user desires in a direction opposite to that of auxiliary handle 24, the guard mechanism 26 can be oriented as depicted in FIG. 1C.

Figure 2A:
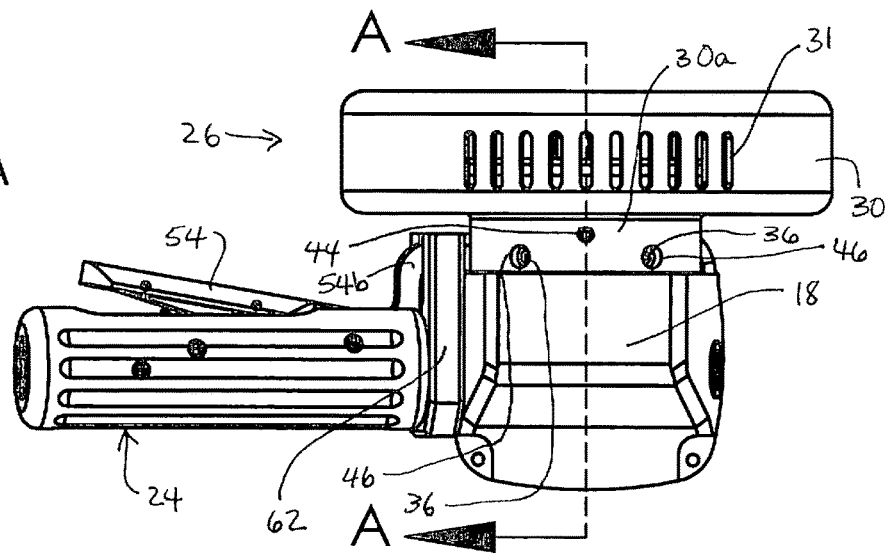
FIG. 2A is a front view of the power tool and guard mechanism of FIG. 1B.
Figure 2B:
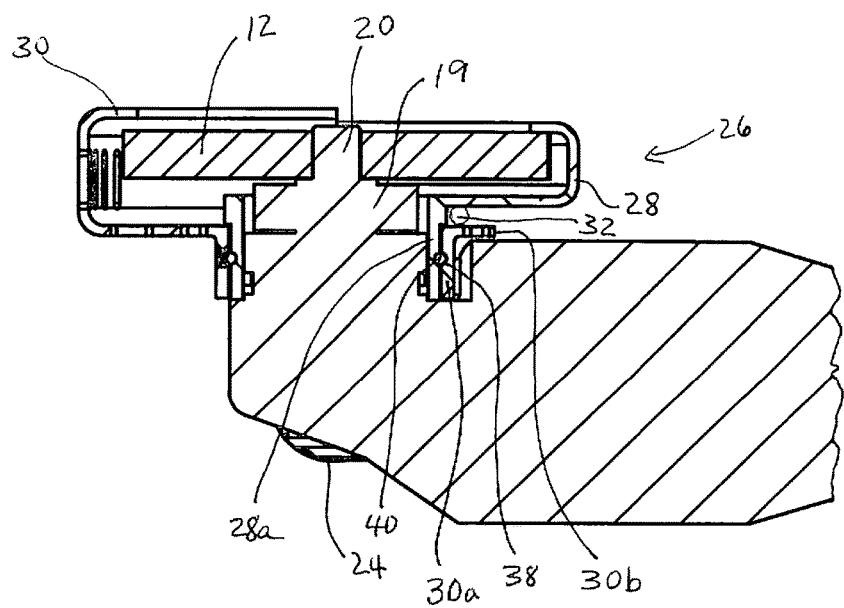
FIG. 2B is a partial cross-sectional view of the power tool and guard mechanism, taken along lines A-A in FIG. 2A.

Referring to FIGS. 2A-2B, the guard portions 28, 30 have coaxial tubular collars 28a, 30a that axially overlap and fit over the spindle housing 19. The collar 28a of the fixed guard portion 28 fits closely over the spindle housing 19 and is fastened thereto with a pair of set screws 36 threaded into the collar 28a. The collar 30a of the movable guard portion 30 fits closely over the collar 28a, and the adjacent internal faces of the collars 28a and 30a have radially aligned circumferential grooves that form a circular raceway 38 in which are disposed a set of metal ball bearings 40. The ball bearings 40 are placed in the raceway 38 though an opening in the collar 30a, and the opening is then closed by a plug 44. And finally, the collar 30a is provided with openings 46 through which the set screws 36 can be accessed when the movable guard portion 30 is in the default or un-retracted position. Adjusting the orientation of the guard mechanism 26 as described above is accomplished by loosening the set screws 36 to permit rotation of the guard mechanism 26 to a desired orientation, and then re-tightening the set screws 36.

Although angle grinder power tools such as depicted are customarily or optionally equipped with an auxiliary or dead handle 24 as shown to help the user stabilize and accurately control the power tool 10, the auxiliary handle 24 is additionally used, according to this invention, to allow the user to selectively latch the movable portion 30 of the guard mechanism 26 in a partially or fully retracted position. And the latch control elements are designed such that the user must be grasping the auxiliary handle 24 in order to retain the second portion 30 in a retracted position, which keeps both of the user's hands safely away from the exposed portion of cutting element 12 in the event of a sudden kickback.

Figure 3A:
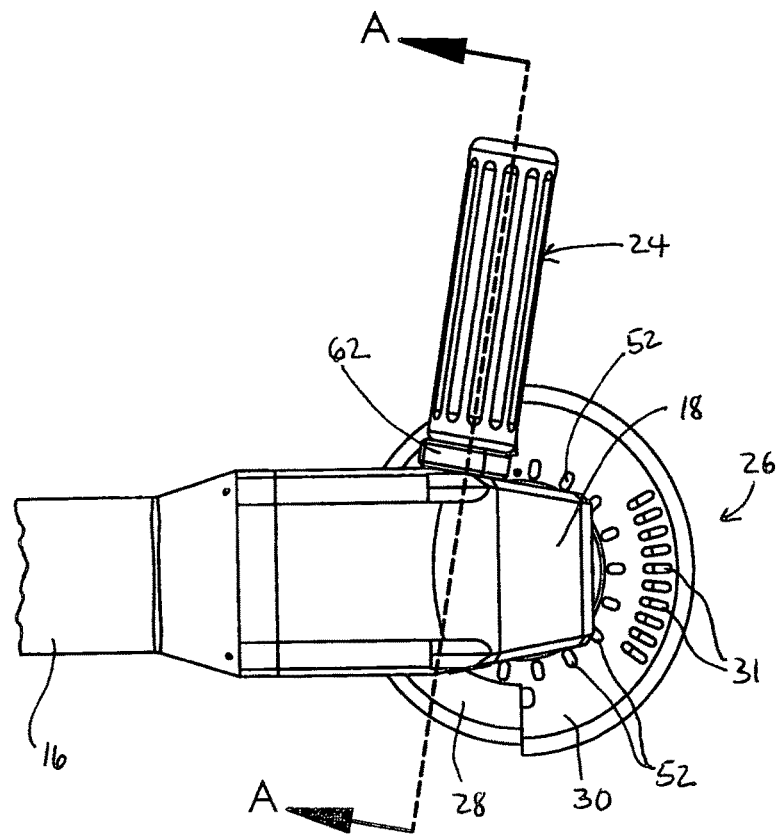
FIG. 3A is a top view of the power tool and guard mechanism of FIG. 1B.
Figure 3B:
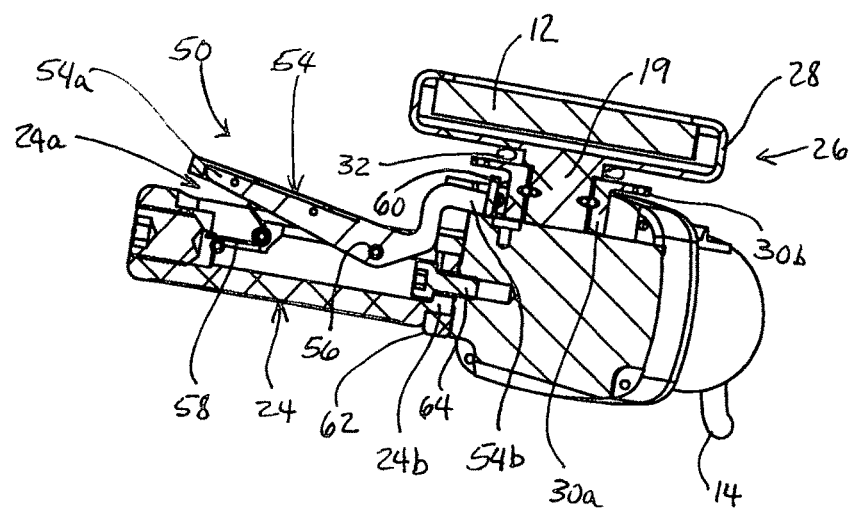
FIG. 3B is a cross-sectional view of the power tool and guard mechanism, taken along lines A-A in FIG. 3A.
Figure 4:
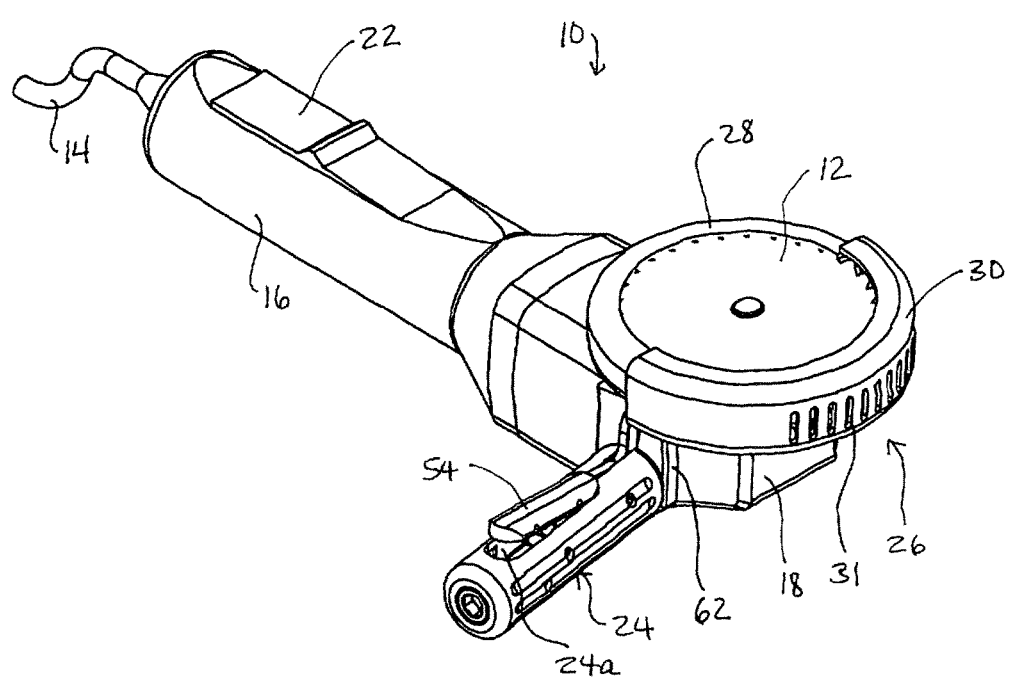
FIG. 4 is a partial isometric view of the underside of the power tool and guard mechanism of FIG. 2B.

Referring to FIGS. 3A-3B and 4, the control apparatus for latching the movable portion 30 of guard mechanism 26 in a retracted position is generally designated by the reference numeral 50. The control apparatus 50 includes an arcuate array or series of openings 52 formed in the upper face of the movable guard portion 30 adjacent its tubular collar 30a, a user-manipulated control lever 54 pivotably mounted within the auxiliary handle 24 on a rolled pin 56 disposed intermediate its inboard and outboard ends, and a torsion spring 58 mounted within the auxiliary handle 24 for establishing a default position of the control lever 54. As best seen in FIG. 4, the outboard end 54a of the control lever 54 protrudes through a slot opening 24a in the underside of the auxiliary handle 24 for manipulation by the tool user, and the torsion spring 58 urges the outboard end of control lever 54 away from the auxiliary handle 24. When the user grips the auxiliary handle 24 and depresses the outboard end of the control lever 54 against the bias force of spring 58, a post 60 on the inboard end 54b of the control lever 54 moves toward and through one of the openings 52 in the upper face of the movable guard portion 30. Preferably, the surface of auxiliary handle 24 surrounding the slot 24a is recessed as shown in FIG. 4 to accommodate the outboard end 54a of the control lever 54 when depressed.

When the power tool 10 is turned off and the cutting element 12 is stationary, the user can manually retract the movable portion 30 of the guard mechanism 26 to a desired position, and then depress the control lever against the auxiliary handle 24 to latch the movable portion 30 in the desired position. Since the cutting element cannot be easily seen when the movable portion 30 is in its default (closed) position, the movable portion 30 is provided with a series of viewing slots 31 through which the user can view the cutting element 12 and verify that it is indeed stationary before manually retracting the movable portion 30. But once the movable portion 30 is manually retracted to the desired position, depressing the outboard end of the control lever 54 in opposition to the bias of torsion spring 58 lowers the post 60 into an aligned opening 52 in the upper face of guard portion 30. The user can then release the movable guard portion 30, and the control apparatus 50 will retain it in the desired retracted position during subsequent operation of the power tool 10. But as soon as the user releases the auxiliary handle 24 (whether the power tool 10 is on or off), the outboard end of the control lever 54 returns to its default position under the bias of spring 58, retracting the post 60 from the guard member opening 52, and allowing the extension spring 32 to return the movable portion 30 of the guard mechanism 26 to its default position depicted in FIG. 1B. As best seen in FIGS. 1A-1C, the upper face of movable guard portion 30 includes a flange 30b on its rear surface so that the openings 52 encircle the collar 30a to ensure that this latching function of control lever 54 will work as described, regardless of the rotary orientation of the guard mechanism 26.

Referring particularly to FIGS. 2A and 3B, the auxiliary handle 24, with the installed control lever 54 and spring 58, are fastened to the front housing 18 of the power tool 10 via an intervening rectangular mounting plate 62. The primary function of the mounting plate 62 is to prevent rotation of the auxiliary handle 24 (and hence, the control lever 54) relative to the power tool's front housing 18. This is achieved by providing a non-circular (hexagonal, for example) mounting opening in the upper end of the mounting plate 62, and providing the inboard end 24*b* of the auxiliary handle 24 with a complementary peripheral surface. The inboard end 24*b* of the auxiliary handle 24 is received within the opening in the upper end of the mounting plate 62, and both pieces are fastened to the front housing 18 of the power tool 10 with a bolt 64 seated in the bore of the auxiliary handle 24. A secondary mounting bolt (not shown) coupling the mounting plate 62 to the front housing 18 prevents the mounting plate from rotating with respect to the housing 18. A secondary function of mounting plate 62 is to support the control lever 54 from any side loading that might occur; to this end, the mounting plate 62 is bifurcated at its lower extremity, and the control lever 54 passes through the slot legs intermediate its inboard and outboard ends, as seen in FIG. 2A.

This mounting arrangement also decouples the auxiliary handle 24 and its control lever 54 from the guard mechanism 26 when the control lever 54 is in its default position, allowing the movable guard portion 30 to rotate relative to the control lever 54, and also allowing the entire guard mechanism 26 to be rotatably adjustable relative to the control lever 54 to suit a given cutting operation, as mentioned above, without affecting the above-described guard latching functionality.

In summary, the improved guard and guard control apparatus of the present invention safely allows a user of a rotary cutting power tool to maintain the retractable portion of a cutting element guard in the retracted position during operation of the power tool in a way that necessarily occupies both hands of the user. This not only helps the user stabilize and accurately control the power tool, but also keeps both of the user's hands safely away from the exposed cutting element in the event of a sudden kickback. The various elements of the guard control apparatus may be constructed of metal or plastic, as appropriate, and of course, it will be recognized that while the invention has been described in reference to the illustrated embodiment, numerous modifications and variations in addition to those mentioned herein will occur to those skilled in the art, and still fall within the intended scope of the invention. For example, the control lever 54 of auxiliary handle 24 may be replaced with a button-activated mechanism, a clamping arrangement can be used to fasten the fixed portion 28 of the guard mechanism 26 to the spindle housing 19, and so forth.

The invention claimed is:

1. A guard and guard control apparatus for a rotary cutting power tool, where the power tool includes a housing and a housing-mounted on/off switch that can be activated when a user grasps the housing, comprising:
   a guard mechanism for at least partially enclosing a rotary cutting element of said power tool, including a fixed guard member that is fastened to the power tool, a retractable guard member coaxial with the fixed guard member that is rotatable with respect to the fixed guard member, and an extension spring for biasing the retractable guard member toward an un-retracted position that fully encloses said rotary cutting element;
   an auxiliary handle affixed to the housing of the power tool and grasped by the user to stabilize and support said power tool; and
   a control apparatus including a spring-biased member on the auxiliary handle that is depressed by the user when the user grasps the auxiliary handle, and latching elements linking said spring-biased member to the retractable guard member so as to hold the retractable guard member in a desired retracted position so long as said user continues to depress said spring-biased member by grasping said auxiliary handle and, and to allow the retractable guard member to return to the un-retracted position under the bias of said extension spring when the user releases the auxiliary handle and said spring-biased member.

2. The guard and guard control apparatus of claim 1, where:
   said spring-biased member is a control lever pivotably mounted on a pivot point in said auxiliary handle, and has an outboard end that is depressed by the user when the user grasps the auxiliary handle; and
   said latching elements include at least one opening in an upper face of said retractable guard member, and a post extending from an inboard end of said control lever that moves into said at least one opening when the outboard end of said control lever is depressed by said user.

3. The guard and guard control apparatus of claim 2, where:
   said latching elements include an arcuate array of openings in the upper face of said retractable guard member, each of said openings corresponding a different desired retracted position of said retractable guard member.

4. The guard and guard control apparatus of claim 2, where:
   said pivot point is disposed intermediate the inboard and outboard ends of said control lever; and a torsion spring in said auxiliary handle biases the outboard end of said control lever toward a default position away from said auxiliary handle.

5. The guard and guard control apparatus of claim 2, further comprising:
   a rectangular mounting plate disposed between said auxiliary handle and the housing of said power tool and fastened to the housing along with said auxiliary handle, said mounting plate having a slot through which said control lever passes intermediate its inboard and outboard ends, thereby to support said control lever against side loading.

6. The guard and guard control apparatus of claim 1, further comprising:
   a mounting plate disposed between said auxiliary handle and the housing of said power tool, said mounting plate having a non-circular mounting opening in which is received an inboard end of said auxiliary handle, the inboard end of said auxiliary handle having a peripheral surface complementary to that of said non-circular mounting opening; and
   a mounting bolt seated in an axial bore of said auxiliary handle for fastening said auxiliary handle and mounting plate to said housing.

7. The guard and guard control apparatus of claim 1, where said power tool includes a spindle housing surrounding a drive shaft on which said rotary cutting element is mounted, and wherein:
   said retractable guard member is rotatably mounted on said fixed guard member; and
   said fixed guard member is releasably fastened to said spindle housing to permit adjustment of a rotary orientation of said guard mechanism with respect to said spindle housing.

8. The guard and guard control apparatus of claim 7, where:

said fixed guard member includes an inner tubular collar disposed about said spindle housing and releasably fastened thereto; and said retractable guard member includes an outer tubular collar that axially overlaps the inner tubular collar of said fixed guard member.

9. The guard and guard control apparatus of claim 8, further comprising:

a set screw threaded into said inner tubular collar for releasably fastening said fixed guard member to said spindle housing; and an access opening in said outer tubular collar through which said set screw can be accessed when said retractable guard member is in said un-retracted position.

10. The guard and guard control apparatus of claim 8, where:

said spring-biased member is a control lever pivotably mounted on a pivot point in said auxiliary handle, and having an outboard end that is depressed by the user when the user grasps the auxiliary handle; and said latching elements include a circular array of openings in an upper face of said retractable guard member adjacent said outer tubular collar, and a post extending from an inboard end of said control lever that moves into a selected one of said openings when said retractable guard member is at least partially retracted and the outboard end of said control lever is depressed by said user.

11. The guard and guard control apparatus of claim 8, where:

adjacent peripheral surfaces of said inner and outer tubular collars are grooved to define a circumferential raceway, in which ball bearings are disposed.

12. The guard and guard control apparatus of claim 1, further comprising:

a series of viewing slots in said retractable guard member through which said rotary cutting element can be viewed to determine if it is stationary.

\* \* \* \* \*